United States Patent
Cui et al.

(10) Patent No.: US 8,909,868 B2
(45) Date of Patent: Dec. 9, 2014

(54) QUALITY OF SERVICE CONTROL METHOD FOR STORAGE SYSTEM

(71) Applicant: Huawei Technologies Co., Ltd., Shenzhen, Guangdong (CN)

(72) Inventors: Wenlin Cui, Chengdu (CN); Qiyao Wang, Beijing (CN); Mingquan Zhou, Shenzhen (CN); Tan Shu, Chengdu (CN); Honglei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/283,783

(22) Filed: May 21, 2014

(65) Prior Publication Data

US 2014/0258609 A1    Sep. 11, 2014

Related U.S. Application Data

(63) Continuation of application No. PCT/CN2012/083171, filed on Oct. 19, 2012.

(30) Foreign Application Priority Data

Nov. 21, 2011 (CN) .......................... 2011 1 0370798

(51) Int. Cl.
| | |
|---|---|
| G06F 12/00 | (2006.01) |
| G06F 13/00 | (2006.01) |
| G06F 13/28 | (2006.01) |
| G06F 3/06 | (2006.01) |
| G06F 12/08 | (2006.01) |

(52) U.S. Cl.
CPC .............. *G06F 3/061* (2013.01); *G06F 3/0689* (2013.01); *G06F 3/0655* (2013.01); *G06F 12/0897* (2013.01); *G06F 12/084* (2013.01); *G06F 2212/282* (2013.01); *G06F 12/0873* (2013.01)
USPC .......................................... 711/129; 711/122

(58) Field of Classification Search
CPC .............. G06F 12/084; G06F 12/0873; G06F 12/0897; G06F 2212/282
USPC ........................................ 711/118, 122, 129
See application file for complete search history.

(56) References Cited

U.S. PATENT DOCUMENTS

| | | | |
|---|---|---|---|
| 8,074,028 B2 * | 12/2011 | Plamondon .................... | 711/129 |
| 2001/0001872 A1 * | 5/2001 | Singh et al. .................... | 711/129 |
| 2005/0071599 A1 | 3/2005 | Modha et al. | |
| 2008/0177975 A1 * | 7/2008 | Kawamura .................... | 711/173 |
| 2008/0244183 A1 * | 10/2008 | Ishikawa et al. .............. | 711/129 |
| 2010/0274964 A1 | 10/2010 | Hashimoto et al. | |

* cited by examiner

FOREIGN PATENT DOCUMENTS

| | | |
|---|---|---|
| CN | 101135994 A | 3/2008 |
| CN | 101373445 A | 2/2009 |
| CN | 101609432 A | 12/2009 |
| CN | 102508619 A | 6/2012 |

*Primary Examiner* — Ryan Bertram
(74) *Attorney, Agent, or Firm* — Leydig, Voit & Mayer, Ltd.

(57) ABSTRACT

A method and a system for controlling quality of service of a storage system, and a storage system. The method includes: collecting information about processing capabilities of the hard disks in the storage system and obtaining processing capabilities of the hard disks according to the information about processing capabilities; dividing a cache into multiple cache tiers according to the processing capabilities of the hard disks; and writing, for a cache tier in which dirty data reaches a preset threshold, data in the cache tier into at least one hard disk corresponding to the cache tier. The method avoids a phenomenon of preempting page resources in the cache.

17 Claims, 6 Drawing Sheets

QUALITY OF SERVICE CONTROL METHOD FOR STORAGE SYSTEM

CROSS-REFERENCE TO RELATED APPLICATION

This application is a continuation application of International Patent Application No. PCT/CN2012/083171, filed on Oct. 19, 2012, which claims priority to Chinese Patent Application No. 201110370798.5, filed on Nov. 21, 2011, both of which are hereby incorporated by reference in their entireties.

TECHNICAL FIELD

The present invention relates to the field of computer technologies, and in particular, to quality of service control method, apparatus, and system for storage system.

BACKGROUND

A cache is a component introduced to improve performance of a storage system and is mainly configured to improve input/output (I/O) performance of the entire system. Some temporary data is stored in this cache, thereby accelerating an I/O response of a host. For a read operation of the host, the system temporarily stores read data in the cache and the cache can be hit directly during the read operation of the host, thereby omitting the operation of accessing at least one hard disk. For a write operation of the host, the system directly caches write data of the host into the cache, thereby omitting the operation of writing data into at least one hard disk. In order to perform the read or write operation smoothly, the data can be prefetched from at least one hard disk into the cache according to a certain policy, where the data is likely to be read by the host next time. This operation can raise a cache hit ratio. In addition, the data written into the cache can be combined based on a certain combination policy before writing the data into the hard disk, thereby reducing the time of implementing the write operation. As can be seen from the above, for read operation, the cache hit ratio can be raised by optimizing a prefetch algorithm or increasing the size of the cache, thereby improving the read performance of the entire storage system. However, when the cache is enlarged to a certain extent, a performance improvement of the read operation and an increase in the size of the cache are disproportionate. Quality of service (QoS) is a quality convention on information transmission and sharing between a network and a user and between users that communicate with each other on the network. The quality of service may include a transmission bandwidth, a transmission delay, a packet loss rate of data, and the like. On the network, the quality of service can be improved by taking measures such as ensuring the transmission bandwidth and reducing the transmission delay, the packet loss rate, and delay variation.

A current storage system supports mixed insertion of various types of hard disks. However, rotational speeds and throughput of different types of disks are different. This always leads to a processing performance difference during writing data into different hard disks. In addition, even for disks of a same type, a processing capability difference may also be caused due to manufacturers or an aging problem. In this scenario, data written into a cache cannot be released in time because of a processing capability difference of back-end disks. As a result, a slow-processing disk occupies more and more page resources, and a processing speed of a fast-processing disk is affected because no cache page is allocated to the fast-processing disk. In addition, even the processing performance of the entire system levels off to that of the slowest disk on the system, that is, the cask effect occurs.

Figure 1:
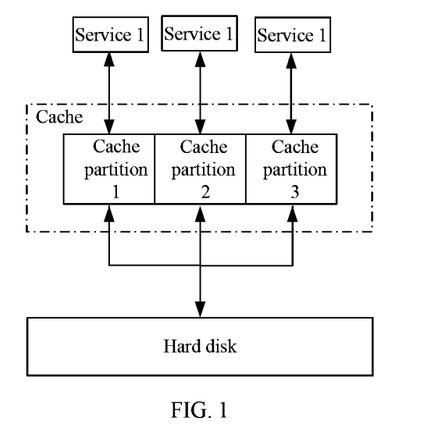
FIG. 1 is a schematic diagram of an application scenario of a cache partition technology in the prior art.

In the prior art, the preceding problem is solved by using a cache partition technology. FIG. 1 is a schematic diagram of an application scenario of a cache partition technology in the prior art. In the prior art, the cache partition technology is used to divide cache resources into multiple cache partitions according to services on a host, each cache partition corresponds to one or more hosts, and the cache partitions are independent of each other and do not affect each other. However, in the prior art, a page resource preemption phenomenon still occurs in each cache partition. As a result, the performance (such as a transmission delay and a packet loss rate) of a service corresponding to a cache partition is affected by the slowest back-end disk, and the quality of service of the storage system is reduced.

SUMMARY

Embodiments of the present invention provide a quality of service control method and a storage system to avoid a phenomenon of preempting page resources in a cache in the prior art and avoid an impact of a slow-speed disk on performance of a high-speed disk.

An embodiment of the present invention provides a quality of service control method, comprising:
collecting information about processing capabilities of the hard disks in the storage system;
dividing the cache into multiple cache tiers according to the processing capabilities of the hard disks, wherein each cache tier separately corresponds to one or more hard disks in the storage system;
determining that data in first cache tier reaches a preset threshold, wherein the first cache tier is one of the cache tiers;
based upon the determination, writing the data in the first cache tier into one or more hard disks which corresponds to the first cache tier.

An embodiment of the present invention provides a storage system, including: a first statistics module, configured to collect information about processing capabilities of hard disks in the storage system; a first dividing module, configured to divide a cache into multiple cache tiers according to the processing capabilities of the hard disks, wherein each cache tier separately corresponds to one or more hard disks in the storage system; and a destage module, configured to determine that data in first cache tier reaches a preset threshold, wherein the first cache tier is one of the cache tiers; and based upon the determination, write the data in the first cache tier into hard disks which corresponds to the first cache tier.

According to the method and the storage system that are provided in the embodiments of the present invention, information about processing capabilities of hard disks in the storage system are collected, a cache is divided into multiple cache tiers according to processing capabilities of the hard disks, and when data in a cache of a certain tier reaches a preset threshold, data in the cache tier is written into at least one hard disk corresponding to the cache tier. In the embodiments of the present invention, the cache is divided into multiple cache tiers, processing capabilities of hard disks corresponding to each tier are different, and some hard disks with a weak processing capability cannot preempt page resources in a cache corresponding to some hard disks with a strong processing capability. Therefore, a cache space corresponding to the hard disks with the strong processing capability can be released in advance. To some extent, this avoids a phenomenon of preempting page resources in the cache in the prior art and avoids an impact of a slow-speed disk on performance of a high-speed disk.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 2:
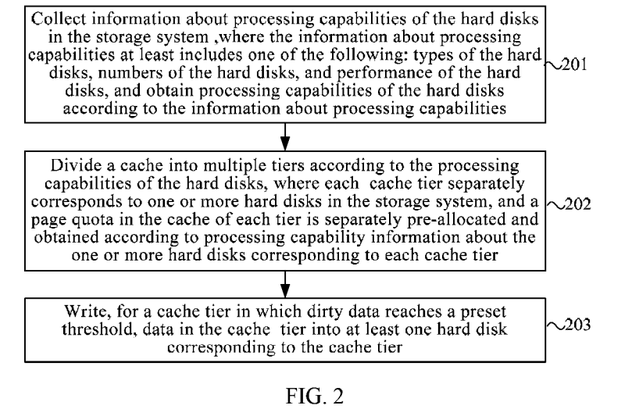
FIG. 2 is a flowchart of Embodiment 1 of a quality of service control method according to the present invention.

FIG. 2 is a flowchart of Embodiment 1 of a quality of service control method according to the present invention. As shown in FIG. 2, this embodiment provides a quality of service control method. The method may specifically include the following steps:

Step 201: Collect information about processing capabilities of the hard disks in the storage system, where the information about processing capabilities at least includes one of the following: types of the hard disks, numbers of the hard disks, and performance of the hard disks, and obtain processing capabilities of the hard disks according to the information about processing capabilities.

Figure 3:
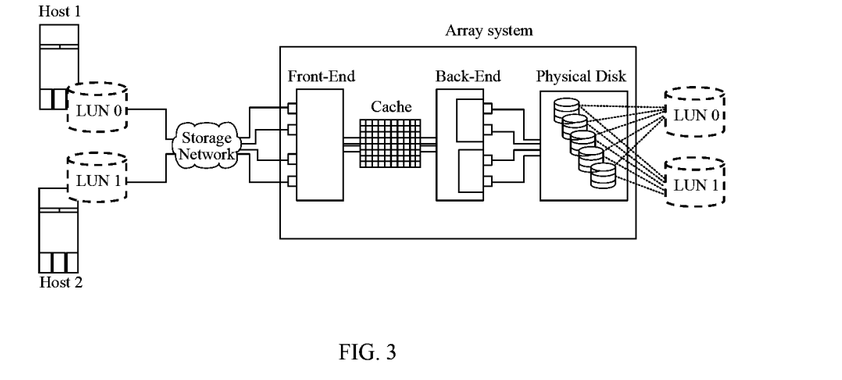
FIG. 3 is a schematic diagram of network architecture of the storage system in Embodiment 1 of the quality of service control method according to the present invention.

FIG. 3 is a schematic diagram of network architecture of the storage system in Embodiment 1 of the quality of service control method according to the present invention. As shown in FIG. 3, a cache is a large memory arranged between a front-end (Front-End) device and a back-end (Back-End) device of an array system. Data read/write performed on a physical disk (Physical Disk) is implemented by using the cache to cache data when a host sends a data read/write operation, thereby omitting the operation of accessing the physical disks. This step is collecting the information about processing capabilities about the hard disks in the storage system. The hard disks herein may specifically be physical disks as shown in FIG. 3. The types of the hard disks may include but are not limited to a solid state disk (Solid State Disk, SSD for short), a serial attached SCSI (Serial Attached SCSI, SAS for short), and a serial advanced technology attachment (Serial Advanced Technology Attachment, SATA for short), where SCSI is short for small computer system interface (Small Computer System Interface). Specifically, this step is collecting the information about processing capabilities of the hard disks included in the current storage system. The processing capabilities of the hard disks may be embodied by their types, aging degrees, performance, and the like. Therefore, the information about processing capabilities herein at least includes one of the following: types of the hard disks, numbers of the hard disks, and performance of the hard disks, and the processing capabilities of the hard disks are obtained according to the information about processing capabilities.

Step 202: Divide a cache into multiple cache tiers (tier, for short) according to the processing capabilities of the hard disks, where each cache tier separately corresponds to one or more hard disks in the storage system, and a page quota in each cache tier is separately pre-allocated according to information about processing capabilities about the one or more hard disks corresponding to each cache tier.

After the processing capabilities of the hard disks are obtained, page resources of the cache are divided according to the processing capabilities of the hard disks. Specifically, the cache is divided into multiple cache tiers, and each cache tier separately corresponds to the one or more hard disks in the storage system. The page quota in each cache tier is separately obtained according to the information about processing capabilities about the one or more hard disks corresponding to each cache tier. In this embodiment, correspondence exists between each tier after the division and the hard disks in the storage system, that is, each cache tier corresponds to one or more hard disks. Specifically, the correspondence between the tier and the hard disk is determined according to information about processing capabilities about each hard disk. For example, if one or more high-speed disks with high processing speeds correspond to one tier, at least one hard disk corresponding to a cache of the tier is a high-speed disk; if one or more medium-speed disks with medium processing speeds correspond to another tier, at least one hard disk corresponding to a cache of the tier is a medium-speed disk; and if one or more low-speed disks with low processing speeds correspond to still another tier, at least one hard disk corresponding to a cache of the tier is a low-speed disk.

Step 203: Write, for a cache tier in which dirty data reaches a preset threshold, data in the cache tier into at least one hard disk corresponding to the cache tier.

After the cache is divided into multiple cache tiers in step 202, this step is as follows: when the dirty data in the cache reaches the preset threshold, for the cache tier in which the dirty data reaches the preset threshold, the data in the cache tier is written, with each cache tier after the division as a unit, into the hard disk corresponding to the cache tier. The dirty data refers to data that is cached in the cache and has been modified but not written into the hard disks. It means that the dirty data is the data which is to be written into the hard disks. The present invention is different from the manner of taking a cache as a unit in the prior art. Therefore, data storage processes of the tiers are independent of each other, and the cache is divided according to the processing capabilities of the hard disks, thereby effectively controlling QoS of the storage system. For example, when the information about processing capabilities is about the types and the number of the hard disks and it is assumed that the storage system includes three types of hard disks, that is, SSD, SAS, and SATA and the number of the hard disks of each type is four, two, and six, the cache can be divided into three tiers, each cache tier separately corresponds to a type of hard disks, and page quotas in the three tiers are divided according to the threshold 2:1:3. In this embodiment, after the page resources of the cache are divided into multiple cache tiers, data in the hard disk corresponding to each cache tier is stored separately with each cache tier after the division as a unit. That is to say, each tier separately corresponds to a type of hard disks with similar processing capabilities, and the tiers are independent of each other and do not affect each other. Therefore, a phenomenon that a slow-speed disk affects a fast-speed disk does not occur.

According to the quality of service control method that is provided in this embodiment, information about processing capabilities about hard disks in the storage system are collected, a cache is divided into multiple cache tiers according to processing capabilities of the hard disks, and when dirty data in a cache of a certain tier reaches a preset threshold, data in the cache tier is written into at least one hard disk corresponding to the cache tier. In this embodiment of the present invention, the cache is divided into multiple cache tiers, processing capabilities of hard disks corresponding to each tier are different, and at least one hard disk with a weak processing capability cannot preempt page resources in a cache corresponding to at least one hard disk with a strong processing capability. Therefore, a cache space corresponding to the hard disks with the strong processing capability can be released in advance. To some extent, this avoids a phenomenon of preempting page resources in the cache in the prior art and avoids an impact of a slow-speed disk on performance of a high-speed disk.

Figure 4:
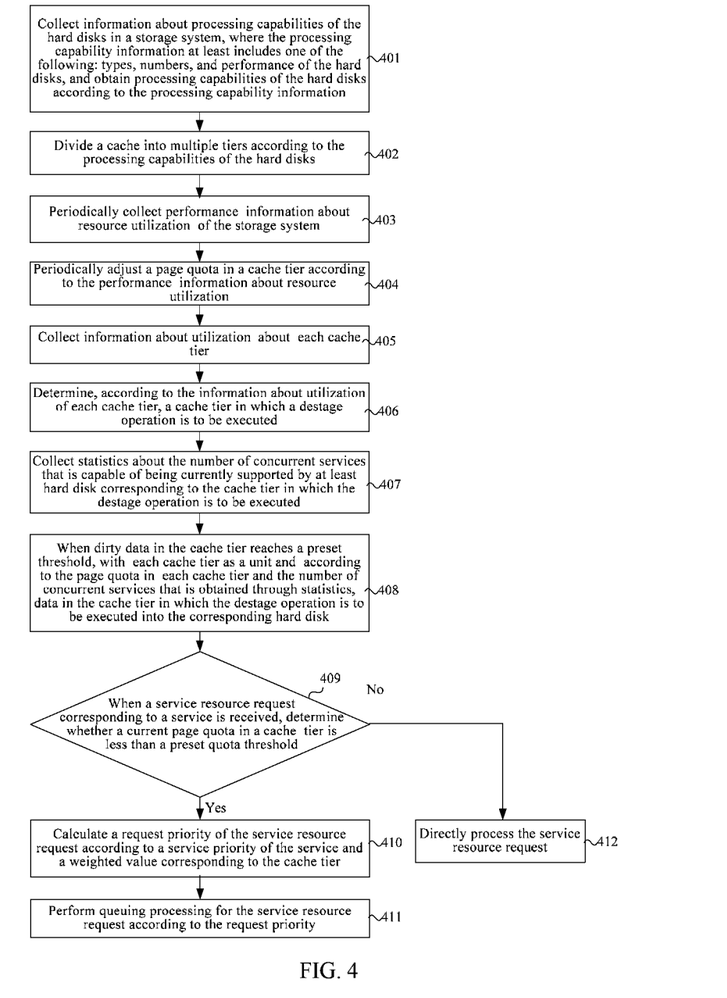
FIG. 4 is a flowchart of Embodiment 2 of a quality of service control method according to the present invention.

FIG. 4 is a flowchart of Embodiment 2 of a quality of service control method according to the present invention. As shown in FIG. 4, this embodiment provides a quality of service control method. The method may specifically include the following steps:

Step 401: Collect information about processing capabilities of the hard disks in the storage system, where the information about processing capabilities at least includes one of the following: types of the hard disks, numbers of the hard disks, and performance of the hard disks, and obtain processing capabilities of the hard disks according to the information about processing capabilities.

Figure 5:
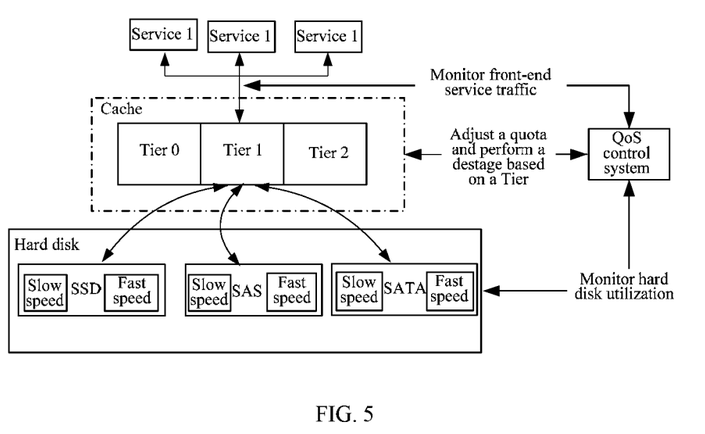
FIG. 5 is a schematic diagram of an application scenario of Embodiment 2 of the quality of service control method according to the present invention.

FIG. 5 is a schematic diagram of an application scenario of Embodiment 2 of the quality of service control method according to the present invention. As shown in FIG. 5, this embodiment is specifically applied to a case where no cache partition mechanism exists and overall cache resources are divided into multiple cache tiers according to the processing capabilities of the hard disks. The core of this embodiment is a QoS control system in FIG. 5. The storage system may be deployed inside the storage system or may be deployed outside the storage system for out-of-band management. The storage system monitors service traffic and other information of the storage system and a utilization rate and other information of at least one hard disk, so as to divide and adjust the cache. At an initialization stage of the storage system, the information about processing capabilities of the hard disks in the storage system are collected, where the information about processing capabilities at least includes one of the following: the types of the hard disks, numbers of the hard disks, and the performance of the hard disks, and the processing capabilities of the hard disks are obtained according to the information about processing capabilities. This step is collecting, by the storage system, statistics about the types and the number of the hard disks in the storage system. The hard disks herein may specifically be the physical disks as shown in FIG. 3. The types of the hard disks may include but are not limited to SSD, SAS, and SATA.

Step 402: Divide a cache into multiple cache tiers according to the processing capabilities of the hard disks.

After the processing capabilities of the hard disks in the storage system are obtained, the storage system divides the cache into multiple cache tiers according to the processing capabilities of the hard disks. When the processing capabilities of the hard disks are specifically obtained according to a threshold of the number of different types of hard disks, after page resources in the cache are divided according to the processing capabilities of the hard disks, a page quota in each cache tier is separately obtained according to the number of one or more hard disks corresponding to each cache tier. For instance, dividing the entire cache into three tiers, that is, tier0, tier1, and tier2. The three tiers separately correspond to a high-speed disk, a medium-speed disk, and a low-speed disk in the hard disks. The high-speed, medium-speed, and low-speed disks herein are obtained according to the types of the hard disks. For example, it is assumed that the storage system includes three types of hard disks, that is, SSD, SAS, and SATA and the number of the hard disks of each type is four, two, and six. Therefore, the cache may be divided into three tiers, each cache tier separately corresponds to a type of hard disks, and page quotas in the three tiers are divided according to the threshold 2:1:3. In this embodiment, after the page resources in the cache are divided into multiple cache tiers, data in each tier of the cache is separately written, with each tier after the division as a unit, into at least one hard disk corresponding to each cache tier, that is, each tier separately corresponds to one type or more similar types of the hard disks. In addition, the processing capabilities of the hard disks may be specifically obtained and obtained according to the performance of the hard disks. The performance of each hard disk changes due to an impact brought by hard disk aging and the like. The performance of the hard disks herein may be current hard disk performance resulting from factors such as swapping, a mechanical failure, and aging in a process of using the hard disks. In this embodiment, the cache is divided according to the processing capabilities of the hard disks, so that a tier after the division relates to an actual processing capability of each hard disk.

Step 403: Periodically collect performance information and information about resource utilization of the storage system.

In a running process of the storage system, the status of each hard disk is changeable. In this embodiment, the page quota in each cache tier needs to be adjusted periodically to adapt to a status change of the hard disks, so as to improve QoS of the storage system. This step is periodically collecting, by the storage system, the performance information and the information about resource utilization of the storage system. The performance information herein includes but is not limited to an average utilization rate of the hard disks and traffic of host services, and the information about resource utilization includes but is not limited to utilization information about the page resources in the cache, utilization information about the page quota in each cache tier, and utilization about computing resources. The average utilization rate of the hard disks is an average utilization rate of different types of the hard disks, the traffic of the host services is historical traffic generated by the host services in caches of different tiers, the utilization information about the page resources in the cache is the utilization of the page resources in the cache, the utilization information about the page quota of each tier in the cache is the utilization of page resources in different tiers, and the utilization information about the computing resources may be the utilization of computing resources such as a CPU. In this embodiment, the storage system may periodically collect the preceding information according to a preset collection period.

Step 404: Periodically adjust a page quota in each cache tier according to the performance information and the information about resource utilization.

After the performance information and the information about resource utilization inside the storage system are collected, the storage system analyzes the average utilization rate of the hard disks, the traffic of the host services, the utilization information about the page resources in the cache, the utilization information about the page quota in each cache tier, and the utilization information about the computing resources, decides through the analysis whether to adjust the page quota in each cache tier, and performs a specific adjustment according to the collected information. The page quota in each cache tier herein is a threshold of page resources divided for each cache tier in the total page resources in the cache. In the running process of the storage system, the preceding information is different at different time. Therefore, herein, the page quota in each cache tier is adjusted according to the collected different information, so that each tier after the division can adapt to a current storage environment more accurately. In this embodiment, the overall adjustment process is a negative feedback process, and adjusted page quota information becomes a basis for a next adjustment. The page quota is being adjusted continuously according to the periodically collected information until the system reaches a steady state. The overall adjustment process may be analyzed and decided based on an adaptive intelligent algorithm such as fuzzy control.

Specifically, in this embodiment, at the initialization stage, the cache is divided into multiple cache tiers. In the running process, the division of the cache is adjusted. That is to say, in a process of adjusting the page quota in the cache tier after the division, the page quota in each cache tier after the division is greater than a preset minimum value of page quotas. That is to say, a minimum quota value exists in each tier after the division and is used for a minimum guarantee to avoid a resource starvation phenomenon in a certain tier.

Step 405: Collect information about utilization about each cache tier.

In a destage process of the cache, generally, in a cache in the prior art, high and low watermarks are preset in the entire cache to control a destage operation executed by the cache, and in an existing cache partition technology, for a cache partition, a cache destage operation is also controlled according to high and low watermarks. Specifically, the destage operation herein is writing data in the cache into a physical hard disk. In this embodiment, the destage operation is performed with a tier as a unit. Different from a control manner executed according to the high and low watermarks in the prior art, during specific execution of the destage operation, the control manner with the high and low watermarks is separately applied to each cache tier. That is to say, a destage control is separately performed for each cache tier and a specific destage policy is determined according to high and low watermarks in each tier. This step is collecting, by the storage system, the information about utilization of each cache tier. The information about utilization of each cache tier herein may include but is not limited to page utilization information of each cache tier, an average utilization rate of the hard disk corresponding to each cache tier, and service traffic in each cache tier. The page utilization information of each cache tier is the utilization of the page resources in each cache tier, the average utilization rate of the hard disk corresponding to each cache tier is an average value of utilization rates of hard disks corresponding to each cache tier, and the service traffic in each cache tier is service traffic currently being processed and saved service traffic processed in historical time in each cache tier.

Step 406: Determine, according to the information about utilization of each cache tier, a cache tier in which a destage operation is to be executed.

After the information about utilization of each cache tier is obtained, the storage system determines, according to the page utilization information of each cache tier, the average utilization rate of the hard disk corresponding to each cache tier, and the service traffic in each cache tier, the tier in which the destage operation is to be executed, that is, decides which tier in which the destage operation is to be executed currently.

Step 407: Collect statistics about the number of concurrent services that is capable of being currently supported by at least one hard disk corresponding to the cache tier in which the destage operation is to be executed.

After the tier in which the destage operation is to be executed is decided, the storage system continues to collect statistics about the number of concurrent services that is capable of being currently supported by the hard disk corresponding to the cache tier in which the destage operation is to be executed and perform, according to the number of concurrent services, destage processing for the tier in which the destage operation is to be executed.

Step 408: When dirty data in each cache tier reaches a preset threshold, write, with each cache tier as a unit and according to the page quota in each cache tier and the number of concurrent services that is obtained through statistics, data in the cache tier in which the destage operation is to be executed into the corresponding hard disk.

In this embodiment, whether to execute the destage operation and the data amount generated by performing the destage operation are decided by collecting statistics about the page utilization of the cache tier in combination with a concurrent status of the hard disk corresponding to the cache tier. When the dirty data in the cache reaches the preset threshold, the data in the cache tier in which the destage operation is to be executed is written, with each cache tier as a unit and according to the page quota in each cache tier and the number of concurrent services that is obtained through statistics, into the corresponding hard disk. The processing capabilities of the hard disks not only relate to the number of the hard disks, but also relate to a service type. Therefore, the number of concurrent services can be dynamically adjusted according the processing capabilities of the hard disks, so that the destage can be more accurately controlled by combining the service traffic, the performance of the hard disks, and the page utilization. This avoids a defect that the hard disk is too busy because of continuous disk brushing in the prior art and increases the life of the hard disk. In this embodiment, after the page resources in the cache are divided into multiple cache tiers, data in each cache tier is separately written, with each cache tier after the division as a unit, into the hard disk corresponding to each cache tier, that is, each tier separately corresponds to a type of hard disks with similar processing capabilities, and the tiers are independent of each other and do not affect each other. Therefore, a phenomenon that a slow-speed disk affects a fast-speed disk does not occur.

Further, in this embodiment, when a service of a host is processed based on the tier, the processing is implemented by using a queuing mechanism based on a page priority of the tier and may specifically include the following steps:

Step 409: When a service resource request corresponding to a service is received, where the service resource request carries tier information, determine whether a current page quota in a cache tier represented by the tier information is less than a preset quota threshold; and if yes, execute step 410; otherwise, execute step 412.

When a certain tier receives a service resource request corresponding to a certain service, where the service resource request carries tier information and the tier information is used to indicate a tier requested by the service resource request, the storage system determines whether a current page quota in a cache of the tier is less than the preset quota threshold, where the quota threshold is a preset value that represents whether a page quota in a cache tier is insufficient. When the current page quota in the cache tier is less than the quota threshold, it indicates that the page quota in the cache tier is insufficient and steps 410 and 411 are executed. Otherwise, step 412 is executed.

Step 410: Calculate a request priority of the service resource request according to a service priority of the service and a weighted value corresponding to the cache tier.

When the current page quota in the cache tier is less than the quota threshold, it indicates that the page quota in the cache tier is insufficient, and queuing processing needs to be performed for the service resource request. The storage system calculates the request priority of the service resource request according to the service priority of the service and the weighted value corresponding to the cache tier. The service priority may be set by the host according to a requirement of a user on a service and the nature of the service, and the weighted value corresponding to the cache tier may be set by the storage system. A request priority of each service resource request can be calculated and obtained according to a service priority of each service and a weighted value in a cache tier to which the service belongs.

Step 411: Perform queuing processing for the service resource request according to the request priority.

When the page quota in the cache tier is insufficient, the storage system performs queuing processing for the service resource request in the cache tier according to the request priority, arranges a service resource request with a high request priority ahead for prior processing, and arranges a service resource request with a low request priority back for non-prior processing.

Step 412: Directly process the service resource request.

When the page quota in the cache tier is sufficient, the storage system does not need to perform queuing processing for the service resource request and may directly process the service resource request to apply for a corresponding page quota.

It should be noted that, in this embodiment, there is no sequential limit between steps 409-412 and step 408. Steps 409-412 may be executed before step 408 or they are executed at the same time. Specifically, this is adjusted according to an actual situation.

According to the quality of service control method that is provided in this embodiment, information about processing capabilities about hard disks in the storage system are collected, a cache is divided into multiple cache tiers according to the information about processing capabilities of the hard disks, and when dirty data in the cache reaches a preset threshold, data in each tier of the cache is separately written, with each cache tier as a unit and according to a page quota in each cache tier, into at least one hard disk corresponding to each cache tier. In this embodiment, cache resources are dynamically divided based on processing capabilities of the hard disks in the storage system, page resources in the entire cache are logically divided into multiple cache tiers, and quota management and application control are performed. This avoids an impact of a slow-speed disk on performance of a high-speed disk. In addition, the page quota in each cache tier is dynamically adjusted according to performance information and information about resource utilization of the current storage system, thereby ensuring reasonable utilization of resources. In this embodiment, destage is performed in a range of a tier. This avoids a problem that a cache page is not released in time due to the hysteresis of a global destage policy adopted in the prior art. In addition, this embodiment avoids a phenomenon of preempting page resources in the cache in the prior art.

Figure 6:
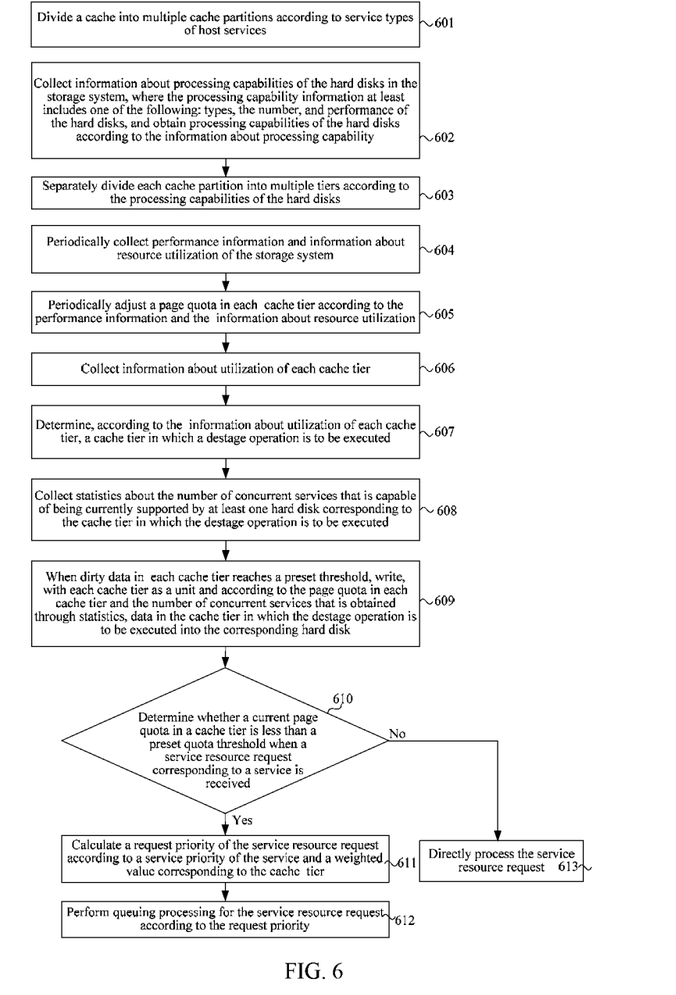
FIG. 6 is a flowchart of Embodiment 3 of a quality of service control method according to the present invention.

FIG. 6 is a flowchart of Embodiment 3 of a quality of service control method according to the present invention. As shown in FIG. 6, this embodiment provides a quality of service control method. The method may specifically include the following steps:

Step 601: Divide a cache into multiple cache partitions according to service types of host services.

Figure 7:
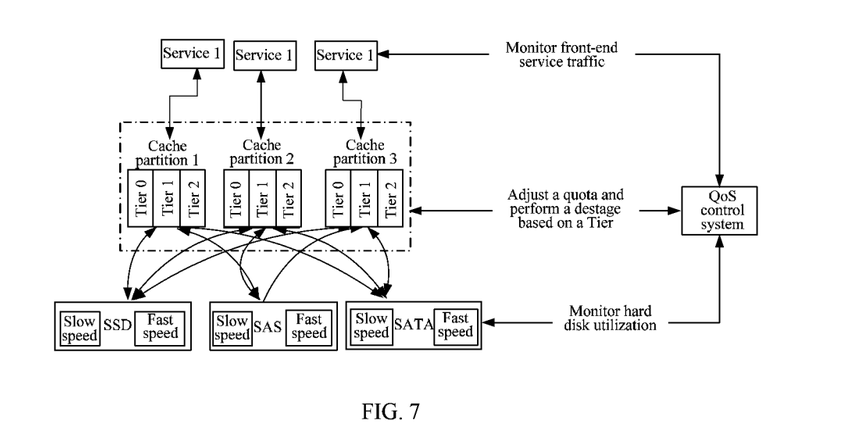
FIG. 7 is a schematic diagram of an application scenario of Embodiment 3 of the quality of service control method according to the present invention.

FIG. 7 is a schematic diagram of an application scenario of Embodiment 3 of the quality of service control method according to the present invention. As shown in FIG. 7, this embodiment is specifically applied to a case where a cache partition mechanism exists and resources in each cache partition are separately divided into multiple cache tiers according to processing capabilities of hard disks. This step is first dividing the cache into multiple cache partitions according to the service types of the host services. Dividing the cache into cache partition 1, cache partition 2, and cache partition 3 is used as an example for description herein.

Step 602: Collect information about processing capabilities of the hard disks in the storage system, where the information about processing capabilities at least includes one of the following: types, the number, and performance of the hard disks, and obtain processing capabilities of the hard disks according to the information about processing capabilities. This step may be similar to step 401 and therefore, no further details are provided herein.

Step 603: Separately divide each cache partition into multiple cache tiers according to the processing capabilities of the hard disks.

After the processing capabilities of the hard disks in the storage system are obtained, a QoS control system divides each cache partition into multiple cache tiers according to the processing capabilities of the hard disks. When the processing capabilities of the hard disks are specifically obtained according to a threshold of the number of different types of hard disks, page resources in each cache partition are separately divided according to the processing capabilities of the hard disks. Specifically, each cache partition is separately divided into multiple cache tiers. Dividing each cache partition into three tiers, that is, tier0, tier1, and tier2, is used as an example for description herein. The three tiers separately correspond to a high-speed disk, a medium-speed disk, and a low-speed disk in the hard disks. In this embodiment, after the page resources in the cache partition are divided into multiple cache tiers, data in at least one hard disk corresponding to each cache tier is separately stored with each cache tier after the division as a unit, that is, each tier separately corresponds to one type or more similar types of the hard disks.

Step 604: Periodically collect performance information and information about resource utilization of the storage system. This step may be similar to step 403, and therefore, no further details are provided herein.

Step 605: Periodically adjust a page quota in each cache tier according to the performance information and the information about resource utilization. This step may be similar to step 404, and therefore, no further details are provided herein.

Step 606: Collect information about utilization of each cache tier. This step may be similar to step 405, and therefore, no further details are provided herein.

Step 607: Determine, according to the information about utilization of each cache tier, a cache tier in which a destage operation is to be executed. This step may be similar to step 406, and therefore, no further details are provided herein.

Step 608: Collect statistics about the number of concurrent services that is capable of being currently supported by at least one hard disk corresponding to the cache tier. This step may be similar to step 407, and therefore, no further details are provided herein.

Step 609: When dirty data in each cache tier reaches a preset threshold, write, with each cache tier as a unit and according to the page quota in each cache tier and the number of concurrent services that is obtained through statistics, data in the cache tier in which the destage operation is to be executed into the corresponding hard disk. This step may be similar to step 408, and therefore, no further details are provided herein.

Step 610: When a service resource request corresponding to a service is received, where the service resource request carries tier information, determine whether a current page quota in a cache tier represented by the tier information is less than a preset quota threshold; and if yes, execute step 611; otherwise, execute step 613. This step may be similar to step 409, and therefore, no further details are provided herein.

Step 611: Calculate a request priority of the service resource request according to a service priority of the service and a weighted value corresponding to the cache tier. This step may be similar to step 410, and therefore, no further details are provided herein.

Step 612: Perform queuing processing for the service resource request according to the request priority. This step may be similar to step 411, and therefore, no further details are provided herein.

Step 613: Directly process the service resource request. This step may be similar to step 412, and therefore, no further details are provided herein.

According to the quality of service control method that is provided in this embodiment, information about processing capabilities about hard disks in the storage system are collected, a cache is divided into multiple cache tiers according to processing capabilities of the hard disks, and when dirty data in a cache of a certain tier reaches a preset threshold, data in the cache tier is written into at least one hard disk corresponding to the cache tier. In this embodiment of the present invention, the cache is divided into multiple cache tiers, processing capabilities of hard disks corresponding to each tier are different, and at least one hard disk with a weak processing capability cannot preempt page resources in a cache corresponding to at least one hard disk with a strong processing capability. Therefore, a cache space corresponding to the hard disk with the strong processing capability can be released in advance. To some extent, this avoids a phenomenon of preempting page resources in the cache in the prior art and avoids an impact of a slow-speed disk on performance of a high-speed disk. In addition, a page quota in each cache tier is dynamically adjusted according to performance information and information about resource utilization of the current storage system, thereby ensuring reasonable utilization of resources. In this embodiment, destage operation is performed in a range of a tier. This avoids a problem that a cache page is not released in time due to the hysteresis of a global destage policy adopted in the prior art. In addition to cache partitioning in this embodiment, one cache partition is also logically divided into multiple cache tiers. This solves a page resource preemption problem caused by a fast-speed disk and a slow-speed disk in the same cache partition.

Persons of ordinary skill in the art should understand that, all or part of the steps of the methods in the embodiments may be implemented by a program instructing relevant hardware. The program may be stored in a computer readable storage medium. When the program is run, the steps of the methods in the embodiments are performed. The storage medium may be any medium that is capable of storing program codes, such as a ROM, a RAM, a magnetic disk, or an optical disk.

Figure 8:
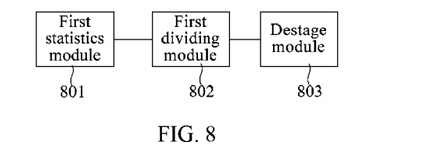
FIG. 8 is a schematic structural diagram of Embodiment 1 of a storage system according to the present invention.

FIG. 8 is a schematic structural diagram of Embodiment 1 of a storage system according to the present invention. As shown in FIG. 8, this embodiment provides a storage system, which is specifically capable of executing the steps in Embodiment 1 of the method. Therefore, no further details are provided herein. The system for controlling quality of service of a storage system that is provided in this embodiment may specifically include a first statistics module 801, a first dividing module 802, and a destage module 803. The first statistics module 801 is configured to collect information about processing capabilities of the hard disks in the storage system, where the information about processing capabilities at least includes one of the following: types of the hard disks, numbers of the hard disks, and performance of the hard disks, and obtain processing capabilities of the hard disks according to the information about processing capabilities. The first dividing module 802 is configured to divide a cache into multiple cache tiers according to the processing capabilities of the hard disks, where each cache tier separately corresponds to one or more hard disks in the storage system, and a page quota in each cache tier is separately pre-allocated according to information about processing capabilities about the one or more hard disks corresponding to each cache tier. The destage module 803 is configured to write, for a cache tier in which dirty data reaches a preset threshold, data in the cache tier into at least one hard disk corresponding to the cache tier.

Figure 9:
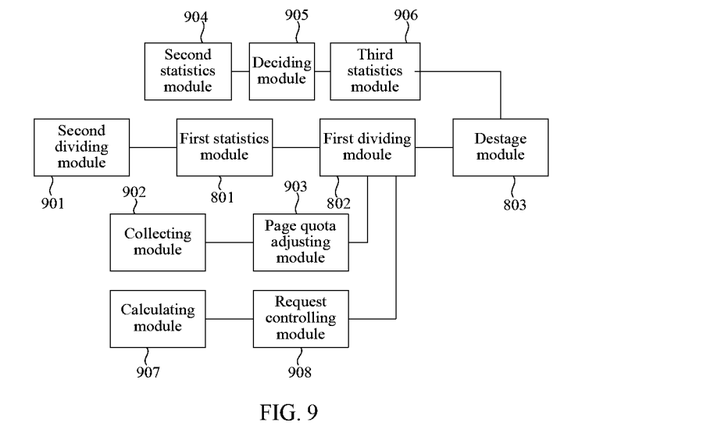
FIG. 9 is a schematic structural diagram of Embodiment 2 of a storage system according to the present invention.

FIG. 9 is a schematic structural diagram of Embodiment 2 of a system for controlling quality of service of a storage system according to the present invention. As shown in FIG. 9, this embodiment provides a system for controlling quality of service of a storage system, which is specifically capable of executing the steps in Embodiment 2 or Embodiment 3 of the method. Therefore, no further details are provided herein. Based on what is shown in FIG. 8, the storage system that is provided in this embodiment further includes a second dividing module 901. The second dividing module 901 is configured to divide the cache into multiple cache partitions according to service types of host services. The first dividing module 802 is specifically configured to separately divide each cache partition into multiple cache tiers according to the processing capabilities of the hard disks.

Further, the storage system that is provided in this embodiment further includes a collecting module 902 and a page quota adjusting module 903. The collecting module 902 is configured to periodically collect performance information and information about resource utilization about the storage system, where the performance information includes an average utilization rate of the hard disks and traffic of the host services, and the information about resource utilization includes utilization information about page resources in the cache, utilization information about the page quota in each cache tier, and utilization about computing resources. The page quota adjusting module 903 is configured to periodically adjust the page quota in each cache tier according to the performance information and the information about resource utilization. The adjusted page quota in each cache tier is greater than a preset minimum value of page quotas.

Further, the storage system that is provided in this embodiment further includes a second statistics module 904, a deciding module 905, and a third statistics module 906. The second statistics module 904 is configured to collect information about utilization about each cache tier, where the information about utilization of each cache tier includes page utilization information of each cache tier, an average utilization rate of at least one hard disk corresponding to each cache tier, and service traffic in each cache tier. The deciding module 905 is configured to determine, according to the information about utilization of each cache tier, a tier in which a destage operation is to be executed. The third statistics module 906 is configured to collect statistics about the number of concurrent services that is capable of being currently supported by at least one hard disk corresponding to the cache tier. The destage module 803 is specifically configured to write, for the cache tier in which the dirty data reaches the preset threshold, according to the number of concurrent services that is obtained through statistics, data in the cache tier in which the destage operation is to be executed into the corresponding hard disk.

Further, the storage system that is provided in this embodiment further includes a calculating module 907 and a request controlling module 908. The calculating module 907 is configured to: when a service resource request corresponding to a service is received, where the service resource request carries tier information, and if a current page quota in a cache tier represented by the tier information is less than a preset quota threshold, calculate a request priority of the service resource request according to a service priority of the service and a weighted value corresponding to the cache tier. The request controlling module 908 is configured to perform queuing processing for the service resource request according to the request priority.

In a practical application, the storage system in this embodiment may be formed of four modules, namely, a system performance data monitoring module, a cache page dividing and quota adjusting module, a performance data analyzing and deciding module, and an algorithm and rule supporting module. The preceding modules may be separately integrated into these four large modules. The system performance data monitoring module is mainly responsible for collecting performance information data inside the entire storage system. The data includes but is not limited to the traffic of the host services, the average utilization rate of the hard disks, cache page utilization, utilization of a cache page quota, and utilization of computing resources such as a CPU. The algorithm and rule supporting module is mainly responsible for providing various adaptive artificial intelligence algorithms, which include a fuzzy control algorithm, and static rules to assist a performance data analysis in deciding a control point and a control granularity. The performance data analyzing and deciding module is mainly responsible for analyzing, with the support of the adaptive algorithms and the static rules, collected performance data to generate a control point and a control granularity for QoS control. The cache page dividing and quota adjusting module is mainly responsible for logically dividing a cache page according to hard disk performance and dynamically adjust a page quota of each divided part according to a performance analysis result. The first statistics module 801, the collecting module 902, the second statistics module 904, and the third statistics module 906 may be integrated into the system performance data monitoring module; the first dividing module 802, the second dividing module 901, and the page quota adjusting module 903 may be integrated into the cache page dividing and quota adjusting module; the deciding module 905, the destage module 803, and the request controlling module 908 may be integrated into the performance data analyzing and deciding module; and the calculating module 907 may be integrated into the algorithm and rule supporting module.

According to the storage system that is provided in this embodiment, information about processing capabilities about hard disks in the storage system are collected, a cache is divided into multiple cache tiers according to processing capabilities of the hard disks, and when dirty data in a cache of a certain tier reaches a preset threshold, data in the cache tier is written into at least one hard disk corresponding to the cache tier. In this embodiment of the present invention, the cache is divided into multiple cache tiers, processing capabilities of hard disks corresponding to each tier are different, and at least one hard disk with a weak processing capability cannot preempt page resources in a cache corresponding to at least one hard disk with a strong processing capability. Therefore, a cache space corresponding to the hard disk with the strong processing capability can be released in advance. To some extent, this avoids a phenomenon of preempting page resources in the cache in the prior art and avoids an impact of a slow-speed disk on performance of a high-speed disk. In addition, a page quota in each cache tier is dynamically adjusted according to performance information and information about resource utilization of the current storage system, thereby ensuring reasonable utilization of resources. In this embodiment, destage operation is performed in a range of a tier. This avoids a problem that a cache page is not released in time due to the hysteresis of a global destage policy adopted in the prior art. In addition to cache partitioning in this embodiment, one cache partition is also logically divided into multiple cache tiers. This solves a page resource preemption problem caused by a fast-speed disk and a slow-speed disk in the same cache partition.

This embodiment further provides a storage apparatus, which may specifically includes a host, a cache, and the system for controlling quality of service of a storage system as shown in FIG. 8 or FIG. 9.

Finally, it should be noted that, the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, as long as such modifications or replacements do not cause the essence of corresponding technical solutions to depart from the scope of the technical solutions of the embodiments of the present invention.

What is claimed is:

1. A quality of service control method, comprising:
   collecting, by a storage system, information about processing capabilities of hard disks in the storage system;
   dividing, by the storage system, a cache into multiple cache tiers based on the collected information, wherein each cache tier corresponds to one or more hard disks in the storage system;

determining, by the storage system, that data in a first cache tier of the multiple cache tiers reaches a preset threshold;

writing, by the storage system, in response to the determining, the data in the first cache tier into one or more hard disks corresponding to the first cache tier.

2. The method according to claim 1, wherein the information about processing capabilities of hard disks in the storage system includes types of the hard disks.

3. The method according to claim 2, wherein the information about processing capabilities further includes a quantity of hard disks of each type.

4. The method according to claim 1, further comprising:

allocating a page quota for each cache tier based on the collected information, wherein the page quota of each cache tier is greater than a preset minimum value.

5. The method according to claim 4, further comprising:

collecting periodically performance information of the storage system and information about resource utilization of the storage system;

wherein the performance information includes an average utilization rate of the hard disks and information regarding traffic of host services; and wherein the information about resource utilization includes information regarding utilization of page resources in the cache, information regarding utilization of the page quota for each cache tier, and information regarding utilization of computing resources.

6. The method according to claim 5, further comprising:

adjusting periodically the page quota for each cache tier based on the performance information and the information about resource utilization.

7. The method according to claim 1, further comprising:

dividing the cache into multiple cache partitions based on service types of host services; and wherein dividing the cache into multiple cache tiers further comprises dividing each cache partition into multiple cache tiers based on the processing capabilities of the hard disks in the storage system.

8. The method according to claim 1, further comprising:

collecting information about utilization of each cache tier, wherein the information about utilization of each cache tier includes page utilization information of each cache tier, an average utilization rate of the one or more hard disks corresponding to each cache tier, and service traffic in each cache tier;

determining that data in a second cache tier of the multiple cache tiers is to be written into the one or more hard disks of the second cache tier based on the information about utilization of each cache tier; and writing, in response to determining that the data in the second cache tier is to be written into the one or more hard disks of the second cache tier, the data in the second cache tier into the one or more hard disks of the second cache tier.

9. A storage system, comprising one or more processors configured to execute processor-executable instructions arranged in modules, the modules including:

a first statistics module, configured to collect information about processing capabilities of hard disks in the storage system;

a first dividing module, configured to divide a cache into multiple cache tiers based on collected information about processing capabilities of hard disks in the storage system, wherein each cache tier corresponds to one or more hard disks in the storage system; and a destage module, configured to determine that data in a first cache tier of the multiple cache tiers reaches a preset threshold; and in response to the determination, write the data in the first cache tier into one or more hard disks corresponding to the first cache tier.

10. The system according to claim 9, wherein the information about processing capabilities of hard disks in the storage system includes types of the hard disks.

11. The system according to claim 10, wherein the information about processing capabilities further includes a quantity of hard disks of each type.

12. The system according to claim 9, wherein the first dividing module further configured to allocate a page quota for each cache tier based on collected information about processing capabilities of hard disks in the storage system, wherein the page quota for each cache tier is greater than a preset minimum value.

13. The system according to claim 12, wherein the modules further include:

a collecting module, configured to periodically collect performance information of the storage system and information about resource utilization of the storage system;

wherein the performance information includes an average utilization rate of the hard disks and information regarding traffic of host services; and wherein the information about resource utilization includes information regarding utilization of page resources in the cache, information regarding utilization of the page quota for each cache tier, and information regarding utilization of computing resources.

14. The system according to claim 13, wherein the modules further include:

a page quota adjusting module, configured to periodically adjust the page quota in each cache tier based on the performance information and the information about resource utilization.

15. The system according to claim 9, wherein the modules further include:

a second dividing module, configured to divide the cache into multiple cache partitions based on service types of host services;

wherein the first dividing module is further configured to divide each cache partition into multiple cache tiers based on the processing capabilities of the hard disks in the storage system.

16. The system according to claim 9, the modules further including:

a second statistics module, configured to collect information about utilization of each cache tier, wherein the information about utilization of each cache tier includes page utilization information of each cache tier, an average utilization rate of the one or more hard disks corresponding to each cache tier, and service traffic in each cache tier; and a deciding module, configured to determine that data in a second cache tier of the multiple cache tiers is to be written into the one or more hard disks of the second cache tier based on the information about utilization of each cache tier;

wherein the destage module is further configured to write the data in the second cache tier into the one or more hard disks of the second cache tier.

17. A non-transitory computer-readable medium, part of a storage system, having processor-executable instructions stored thereon, the processor-executable instructions comprising instructions for:

collecting information about processing capabilities of hard disks in the storage system;

dividing a cache into multiple cache tiers based on the collected information, wherein each cache tier corresponds to one or more hard disks in the storage system;

determining that data in a first cache tier of the multiple cache tiers reaches a preset threshold;

writing in response to the determining, the data in the first cache tier into one or more hard disks corresponding to the first cache tier.

* * * * *